US011297223B2

(12) United States Patent
Rakshit et al.

(10) Patent No.: US 11,297,223 B2
(45) Date of Patent: Apr. 5, 2022

(54) DETECTING CONDITIONS AND ALERTING USERS DURING PHOTOGRAPHY

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

(21) Appl. No.: 16/193,480

(22) Filed: Nov. 16, 2018

(65) Prior Publication Data

US 2020/0162663 A1 May 21, 2020

(51) Int. Cl.
*H04N 5/232* (2006.01)
*H04N 5/225* (2006.01)
*G06V 20/20* (2022.01)

(52) U.S. Cl.
CPC ......... *H04N 5/23218* (2018.08); *G06V 20/20* (2022.01); *H04N 5/2256* (2013.01); *H04N 5/22525* (2018.08); *H04N 5/23203* (2013.01)

(58) Field of Classification Search
CPC ........... H04N 5/23203; H04N 5/23206; H04N 5/23218; H04N 5/23222; H04N 5/232941; H04N 5/22525; H04N 5/2256; G06K 9/00671; G06V 20/20; G06V 20/64; G06V 2201/10
See application file for complete search history.

(56) References Cited

U.S. PATENT DOCUMENTS

| 6,084,510 A | 7/2000 | Lemelson et al. |
| 7,851,758 B1 | 12/2010 | Scanlon et al. |
| 8,624,727 B2 | 1/2014 | Saigh et al. |

(Continued)

FOREIGN PATENT DOCUMENTS

CN 205104006 3/2016

OTHER PUBLICATIONS

Tsai et al., "A Practical Guide to MR Imaging Safety: What Radiologists Need to Know", Radio Graphics, https://doi.org/10.1148/rg.2015150108, Oct. 14, 2015, 11 pages.

(Continued)

*Primary Examiner* — Lin Ye
*Assistant Examiner* — Chriss S Yoder, III
(74) *Attorney, Agent, or Firm* — Randy Emilio Tejeda; Andrew D. Wright; Roberts Calderon Safran & Cole, P.C.

(57) ABSTRACT

A computer-implemented method includes: receiving, by a computer device, image data and distance data from a camera device; detecting, by the computer device, an object in the image data; determining, by the computer device, a condition based on the detected object, wherein the condition is one of a hazardous condition, a dangerous condition, and a spoil condition; and transmitting, by the computer device, an instruction to the camera device based on the determined condition, wherein the instruction causes the camera device to output an alert to a user of the camera device, the alert being based on the determined condition and the distance data.

20 Claims, 4 Drawing Sheets

(56) References Cited

U.S. PATENT DOCUMENTS

| | | | | |
|---|---|---|---|---|
| 8,953,841 | B1* | 2/2015 | Leblang | G06K 9/00671 |
| | | | | 382/103 |
| 9,383,445 | B2 | 7/2016 | Lu et al. | |
| 10,311,304 | B2* | 6/2019 | Bender | G06F 3/011 |
| 10,379,219 | B1* | 8/2019 | Nazarian | G01B 11/26 |
| 2009/0322547 | A1 | 12/2009 | Wen | |
| 2010/0309225 | A1* | 12/2010 | Gray | G06K 9/4676 |
| | | | | 345/633 |
| 2011/0267492 | A1* | 11/2011 | Prentice | H04N 5/232933 |
| | | | | 348/223.1 |
| 2012/0194554 | A1* | 8/2012 | Kaino | G08B 13/19621 |
| | | | | 345/633 |
| 2014/0015965 | A1* | 1/2014 | Dunko | H04N 5/232 |
| | | | | 348/143 |
| 2014/0180582 | A1* | 6/2014 | Pontarelli | G01C 21/20 |
| | | | | 701/494 |
| 2017/0220863 | A1* | 8/2017 | Lection | G02B 27/0172 |

OTHER PUBLICATIONS

Hagedorn, "Obstacle Warning for Texting", ETH, Distributed Computing, Sep. 22, 2014, 47 pages.

Beaucourt, "Real-time and video processing object detection using Tensor", http://www.agaetis.fr/, accessed Nov. 15, 2018, 8 pages.

Unknown, "15 Best Measure Distance Apps for Android & | Free apps for android, IOS, Windows and Mac", accessed Sep. 27, 2018, 12 pages.

Robinson et al., "Training and serving a realtime mobile object detector in 30 minutes with Cloud TPUs", accessed Nov. 15, 2018, 16 pages.

Rosebrock, "Object detection with deep learning and OpenCV", https://www.pyimagesearch.com/2017/09/11/object-detection-with-deep-learning-and-opencv/, Deep Learning, OpenCV 3, Tutorials, Sep. 11, 2017, 15 pages.

Rosebrock, "Real-time object detection with deep learning and OpenCV", https://www.pyimagesearch.com/2017/09/18/real-time-object-detection-with-deep-learning-and-opencv/, Deep Learning, OpenCV 3, Tutorials, Sep. 18, 2017, 9 pages.

Rosebrock, "Find distance from camera to object/marker using Python and OpenCV", Image Processing, Tutorials, Jan. 19, 2015, 13 pages.

Watanabe, "How to build real-time object recognition iOS app", accessed Nov. 15, 2018, 5 pages.

* cited by examiner

DETECTING CONDITIONS AND ALERTING USERS DURING PHOTOGRAPHY

BACKGROUND

The present invention relates generally to digital photography and, more particularly, to alerting users to conditions during digital photography.

When taking photos, the distance between the photographer and the subject or object can vary. There are scenarios where the distance and approach of the photographer and the object or subject can be dangerous or spoil the photo.

SUMMARY

In a first aspect of the invention, there is a computer-implemented method including: receiving, by a computer device, image data and distance data from a camera device; detecting, by the computer device, an object in the image data; determining, by the computer device, a condition based on the detected object, wherein the condition is one of a hazardous condition, a dangerous condition, and a spoil condition; and transmitting, by the computer device, an instruction to the camera device based on the determined condition, wherein the instruction causes the camera device to output an alert to a user of the camera device, the alert being based on the determined condition and the distance data.

In another aspect of the invention, there is a computer program product including a computer readable storage medium having program instructions embodied therewith. The program instructions are executable by a computing device to cause the computing device to: receive image data, distance data, and location data from a camera device; detect an object in the image data based on the location data; determine a condition based on the detected object, wherein the condition is one of a hazardous condition, a dangerous condition, and a spoil condition; and transmit an instruction to the camera device based on the determined condition, wherein the instruction causes the camera device to output an alert to a user of the camera device, the alert is based on the determined condition and the distance data, and the alert includes a distance related instruction.

In another aspect of the invention, there is camera device comprising: an image sensor that captures image data; a computer processor; a computer memory; a display; a speaker; and a flash. The camera device is configured to: determine distance data comprising a distance from the camera device to an object in a field of view of the image sensor; determine a location of the camera device; transmit the image data, the distance data, and the location to a server; and output an alert to a user of the camera device based on an instruction from the server, wherein the alert includes an identification of an object detected in the image data and a distance related instruction based on the distance data.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to digital photography and, more particularly, to alerting users to conditions during digital photography. According to aspects of the invention, there is a system and method for a user with a digital camera device to stream images to a remote cognitive system to identify objects in a photo and search data sources for the identified objects to determine if hazardous, dangerous, or conditions exist that would spoil the desired photo. In cases when the object is deemed to be hazardous or dangerous, aspects of the invention provide a notification message to the photographer on the display of the digital camera device, the notification message indicating the identified object, severity, and a safe distance to take the photo or video. Additional aspects of the invention include providing a notification message when a spoil condition is determined and disabling features of the digital camera device such as a flash or a shutter burst that may make noise and startle the subject of the photo. In this manner, implementations of the invention provide a system and method to avoid spoiling a photo when the digital camera device is within a specified distance of a subject of the photo, and enabling the features once the digital camera device exits the specified distance from subject.

Often times a photographer in the act of staging and taking a photograph may be unaware of hazardous, dangerous, or spoil conditions associated with the photograph. Hazardous conditions as used herein refer to hazards in the environment that are hazardous to a particular user, such as an allergen that the photographer is susceptible to. Dangerous conditions as used herein refer to dangers in the environment that are dangerous to any person, such as a dangerous animal, brush fire, etc. Spoil conditions as used herein refer to scenarios in which getting to close to the subject of a photograph causes the subject to move or flee, thereby spoiling the photograph. Examples include getting too close to birds, as the flash or sound of the camera may cause them to flee. Another example is getting to close to a person, which may cause the person to blink and thus spoil the photo. Accordingly, there is a need for a method and system that automatically identifies objects that are hazardous or dangerous, or conditions that will spoil a photograph, and that alerts the photographer of a safe distance from which to take the photograph.

Implementations of the invention address the aforementioned need by providing a method and system that: determine a purpose and location of a photography session; identify objects in the environment of the photography session; perform contextual analysis of the identified objects; alert a user of the object properties and a safe distance to take the photo; and modify features or setting of the digital camera device based on the determined context. Implementations of the invention thus provide an improvement to the technology of digital photography by automatically determining and notifying a user of hazardous, dangerous, and spoil conditions, and by automatically controlling features of a digital camera device based on the determining. Embodiments of the invention utilize techniques that are inherently computer-based and that have no pre-computer analog, such as computer vision based object detection and natural language processing based contextual analysis.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
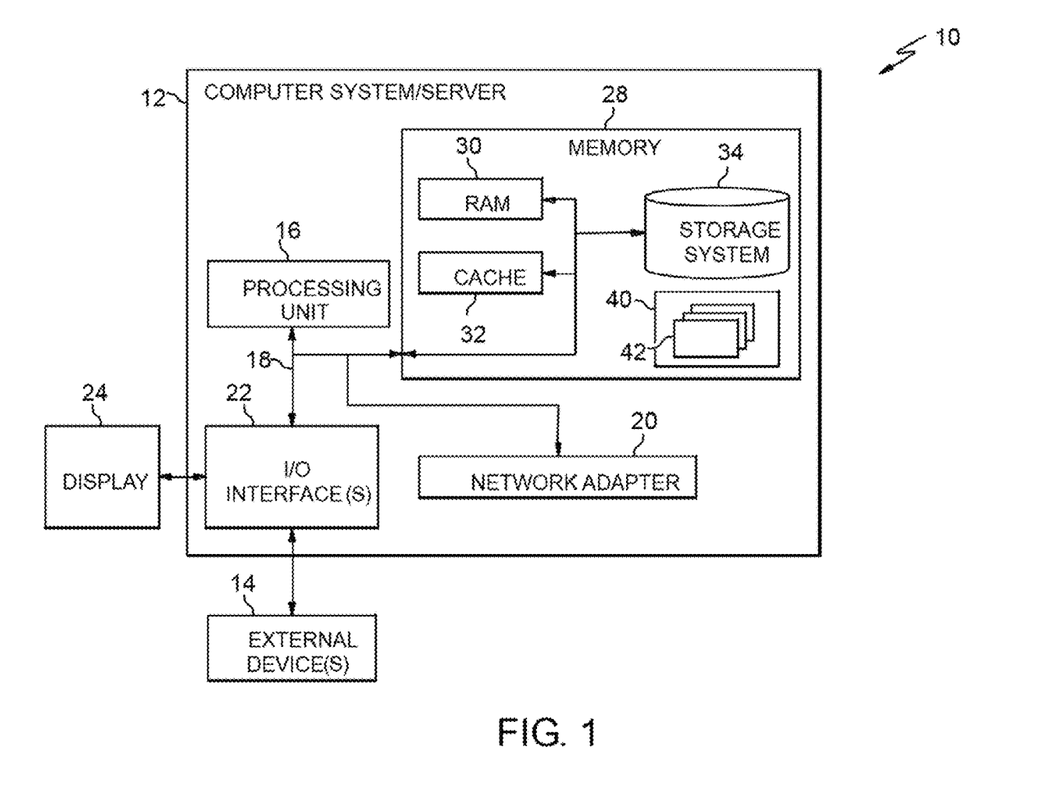
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
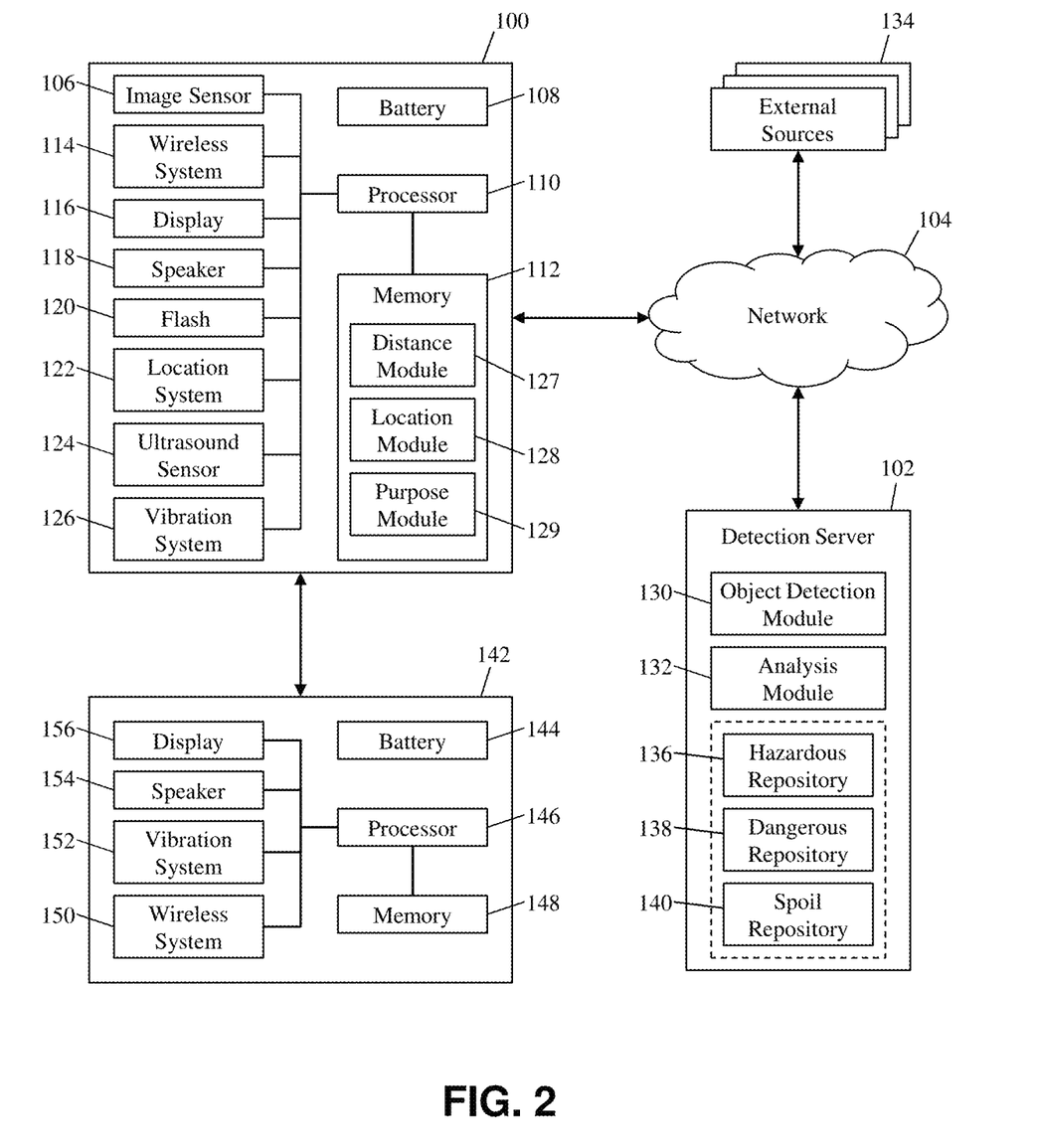
FIG. 2 shows a block diagram of an exemplary environment in accordance with aspects of the invention.

FIG. 2 shows a block diagram of an exemplary environment in accordance with aspects of the invention. In embodiments, the environment includes a camera device 100 in communication with a detection server 102 via a network 104. The network 104 may be a suitable communication network or combination of communication networks including one or more of a LAN, WAN, and the Internet.

In embodiments, the camera device 100 is a digital camera device such as a smartphone, a digital camera, and augmented reality (AR) glasses, and comprises an image sensor 106, battery 108, computer processor 110, computer memory 112, and wireless system 114. The image sensor 106 is one or more solid-state devices that capture light to form a digital image, and may include a conventional sensor (e.g., a CCD sensor or a CMOS sensor) or any suitable later developed sensor. The battery 108 stores and provides electrical charge that powers elements in the camera device 100 and may be a rechargeable battery. The memory 112 stores one or more program applications for execution by the processor 110, which controls operation of elements of the camera device 100. The wireless system 114 comprises at least one antenna that is configured to provide wireless communication via the network 104, e.g., via Wi-Fi, cellular, etc.

The camera device 100 optionally includes at least one of the following additional elements that are powered by the battery 108 and operatively connected to the processor 110: a video display 116, such as an LCD (liquid crystal display) and preferably a touchscreen LCD; an audio speaker 118 configured to emit sounds; a flash 120 configured to emit a flash of light, e.g., as used in photography; a location system 122 such as a global positioning system (GPS); an ultrasound sensor 124; and a vibration system 126, such as a motor that rotates an eccentric mass to selectively vibrate the camera device 100. The camera device 100 may also include at least one of a gyroscope, a magnetometer compass, an infrared (IR) camera, and an infrared emitter (not shown). The camera device 100 may provide conventional digital camera functionality by collecting light through a lens, capturing an image with the image sensor 106, optionally performing digital processing of the captured image via the processor 110, storing data defining the image in memory 112, and displaying the image on the display 116.

Still referring to the camera device 100, in embodiments the memory 112 includes a distance module 127, a location module 128, and a purpose module 129, each of which may be a program module such as program module 42 described with respect to FIG. 1. The distance module 127 is configured to determine a distance from the camera device 100 to an object in the field of view of the camera device 100. The field of view is the area of the real world from which light is captured on the image sensor 106. The distance module 127 may be programmed to determine the distance using numerical techniques such as triangle similarity, for example. Additionally or alternatively, the distance module 127 may be programmed to determine the distance using a transmitter and receiver system that measures the time for a reflection of an emitted signal to return to the camera device 100. In embodiments, the distance module 127 determines a distance for each frame of image data captured by the device.

The location module 128 is configured to determine a location of the camera device 100 by analyzing user data. In an exemplary implementation, the camera device 100 is a smartphone that has access to user data such as emails, text messages, social media posts, calendar entries, and mapping applications. For example, the smartphone may have access to this data via applications that are stored on and executed by the smartphone, e.g., via an email application that the user uses on the smartphone. In this exemplary implementation, the location module 128 is configured to analyze user data to determine a location of the camera device 100. Such location determination via user data is useful when the camera device 100 does not include a location system 122, and when the camera device 100 includes a location system 122 but the location system 122 in inoperable for any reason.

As an illustrative example, a user may post on their social media that they are planning on going to Umstead Park at 6:00 PM to capture photos of warbler birds. Based on analyzing this user data (i.e., social media in this example), the location module 128 may determine that Umstead Park is the location of the camera device 100 at 6:00 PM. In another example, the user may enter an address into their mapping application to obtain directions, and the location module 128 may determine that the location of the camera device is the address entered into the mapping application. These are just two examples, and the location module 128 may analyze any one or more types of the user data to determine a location of the camera device 100. In embodiments, the location module 128 converts a location determined in this manner into location data similar to that produced by the location system 122, e.g., location coordinates such as longitude and latitude. In aspects, the location module 128 analyzes the user data using contextual analysis techniques such as natural language processing.

The purpose module 129 is configured to determine a purpose of the user of the camera device 100 by analyzing user data. In an exemplary implementation, the camera device 100 is a smartphone that has access to user data such as emails, text messages, social media posts, calendar entries, and mapping applications. As an illustrative example, a user may post on their social media that they are planning on going to Umstead Park at 6:00 PM to capture photos of warbler birds. Based on analyzing this user data (i.e., social media in this example), the purpose module 129 may determine that the purpose of a photo is a warbler bird, and this determined purpose data may be used in object detection described herein. This is just one example, and the purpose module 129 may analyze any one or more types of user data to determine a purpose of the camera device 100. In aspects, the purpose module 129 analyzes the user data using contextual analysis techniques such as natural language processing.

In embodiments, the camera device 100 is paired with a wearable computer device 142, such as a smart watch. In aspects, the wearable computer device 142 comprises a battery 144, a computer processor 146, a computer memory 148, a wireless system 150, and at least one of a vibration system 152, an audio speaker 154, and a visual display 156. The camera device 100 may be paired with the wearable computer device 142 using short range wireless communication (e.g., Bluetooth) via the wireless system 114 and the wireless system 150. In some implementations, alerts regarding the camera device 100 are transmitted to the wearable computer device 142 as described herein.

According to aspects of the invention, the camera device 100 is configured to transmit image data captured by the image sensor 106 to the detection server 102 via the network 104. In embodiments, the camera device 100 streams the image data to the detection server 102 in real time or near real time (NRT). In one example, the display 116 displays the image data captured by the image sensor 106 in real time (as is commonly done with smartphones and digital cameras), and the wireless system 114 concurrently transmits the same data that is displayed on the display 116 to the detection server 102. In this manner the image data is displayed and transmitted in real time, and received by the detection server 102 in near real time.

In embodiments, the camera device 100 also transmits distance data along with the image data that is sent to the detection server 102. In embodiments, each frame of image data sent to the detection server 102 is accompanied by distance data determined by the distance module 127. In additional embodiments, each frame of image data sent to the detection server 102 is accompanied by at least one of: location data (e.g., GPS data) determined by the location system 122; location data determined by the location module 128; purpose data determined by the purpose module 129; and ultrasound data detected by the ultrasound sensor 124. In one example, each frame of image data transmitted by the camera device 100 to the detection server 102 is associated with: a determined distance from the camera device 100 to an object in the frame when image data was captured; a determined location of the camera device 100 when the image data was captured; and ultrasound data detected by the camera device 100 when the image data was captured.

Still referring to FIG. 2, the detection server 102 comprises a computer device such as computer system 12 of FIG. 1 that is remotely located relative to the camera device 100. In an exemplary implementation, the detection server 102 comprises one or more servers in a cloud computing environment, and the camera device 100 accesses the detection server 102 via the network 104 to obtain one or more services provided by the detection server 102.

In embodiments, the detection server 102 comprises an object detection module 130 and an analysis module 132, each of which may be program modules 42 as described with respect to FIG. 1. In embodiments, the detection server 102 may include additional or fewer modules than those shown in FIG. 2. In embodiments, separate modules may be integrated into a single module. Additionally, or alternatively, a single module may be implemented as multiple modules.

According to aspects of the invention, the object detection module 130 is configured to identify one or more objects included in the image data that is received from the camera device 100. Object detection (also called object recognition) is a computer-based technology in the field of computer vision for finding and identifying objects in an image or video sequence. Object detection can be used to identify one or more objects in an image frame in real time. Object detection can also be used to identify where the identified object(s) lie in the image, for example by generating bounding boxes that are drawn around the object(s) in the image, e.g., superimposed on the image. Object detection can be performed using deep learning techniques, for example, where deep learning is a domain of machine learning that is useable in the field of computer vision. Deep learning based object detection can be used with video streams to perform real-time object detection in a video stream such as a sequence of image frames. In embodiments, the object detection module 130 is configured to identify one or more objects in each frame of image data that is received from the camera device 100, and to output data defining the identified object(s) to the analysis module 132.

In embodiments, the object detection module 130 utilizes location data received with the image data (e.g., GPS data from the location system 122 and/or the location module 128) in the object detection process. For example, the location data may be used to differentiate between similar animals that have different geographic ranges. For example, the eastern coral snake (*Micrurus fulvius*) is a venomous snake that looks very similar to the nonvenomous scarlet kingsnake (*Lampropeltis elapsoides*). The two snakes have different geographic ranges with only a small amount of overlap. Each of the snakes have red, black, and yellow coloration, but with different patterns on the different types of snake. In embodiments, the object detection module 130 bases the object detection at least in part on a comparison of the location data received from the camera device 100 to other data obtained from external sources 134.

For example, in an illustrative use case a user of the camera device 100 is attempting to take a picture of a snake that has red, black, and yellow coloration. The camera device 100 sends this image data and the associated location data to the detection server 102. In this exemplary scenario, the object detection module 130 determines from the shape and coloration that the object in the image is either a coral snake or a scarlet kingsnake. In this scenario, the detection server 102 accesses information from one or more external sources 134 to determine the geographic range of the coral snake and the geographic range of the scarlet kingsnake. The object detection module 130 compares the location data associated with the image to the determined geographic ranges of the different snakes. If the location data is inside the range of the coral snake and outside the range of the scarlet kingsnake, then the object detection module 130 has a higher confidence in identifying the object as a coral snake. Conversely, if the location data is inside the range of the scarlet kingsnake and outside the range of the coral snake, then the object detection module 130 has a higher confidence in identifying the object as a scarlet kingsnake. In this manner, the object detection module 130 may use the location data associated with the image data to improve the object detection function that it performs with the image data.

In additional embodiments, the object detection module 130 utilizes purpose data received with the image data (e.g., purpose data determined by the purpose module 129) in the object detection process. For example, when the determined purpose is warbler birds (e.g., described above) and the object detection module 130 determines that a bird in the image data appears similar to a warbler bird, the object detection module 130 may increase the confidence score for warbler bird based on the purpose data. In this manner, the object detection module 130 may use the purpose data associated with the image data to improve the object detection function that it performs with the image data.

According to aspects of the invention, the analysis module 132 is configured to compare an object detected in the image (identified by the object detection module 130) to data contained in at least one of a hazardous repository 136, a dangerous repository 138, and a spoil repository 140. Each repository 136, 138, 140 may be a searchable data repository that is stored, for example, in a storage system such as storage system 34 of FIG. 1. The repositories 136, 138, 140 may be separate or may be combined in a single data repository.

In embodiments, the hazardous repository 136 stores data that defines objects that are hazardous to a defined user. In embodiments, a user manually enters data that is stored in the hazardous repository 136. For example, a user may enter data that about their allergies (e.g., allergic to bee stings) via a user interface of the system, and the system may store this data in the hazardous repository 136 in association with this user. Additionally or alternatively, the system may automatically obtain data to store in the hazardous repository 136 by analyzing user data such as emails, text messages, social media posts, and medical records. For example, the system may analyze this user data using contextual analysis techniques, such as natural language processing, to determine an allergy of the user (e.g., allergic to oak pollen), and may store this data in the hazardous repository 136.

Regarding any user data that is used to populate the hazardous repository 136, to the extent implementations of the invention collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In aspects, each object defined in the hazardous repository 136 is stored with an object name, an associated severity score, and an associated safe distance. The severity score may be based on any desired scale, such as 1 to 5 with 1 being the least severe and 5 being the most severe. For example, the allergy to bee stings may be rated as a severity of 5, and the allergy to oak pollen may be rated as a severity of 3. The safe distance is a user-defined distance that the user wishes to stay away from a defined object. In embodiments, a user manually enters a severity score and a safe distance for each respective object stored in the hazardous repository 136, e.g., via a user interface of the system. In aspects, each object defined in the hazardous repository 136 is also stored with at least one representative image of the object.

In embodiments, the dangerous repository 138 stores data that defines objects that are considered as potentially dangerous to plural users. For example, the dangerous repository 138 may store data defining toxic plants (e.g., poison ivy, oleander, etc.) and venomous animals (e.g., coral snake, black widow spider, box jellyfish, etc.). In embodiments, a system administrator controls the data that is stored in the dangerous repository 138, and this data may be input to the dangerous repository 138 in any suitable manner including manual data entry, data import, etc.

In aspects, each object defined in the dangerous repository 138 is stored with an object name, an associated severity score, and an associated safe distance. The severity score may be based on any desired scale, such as 1 to 5 with 1 being the least severe and 5 being the most severe. For example, the coral snake may be rated as a severity of 5, the black widow spider may be rated as a severity of 3, and the poison ivy may be rated as a severity of 1. The safe distance is a pre-defined distance associated with each object and, in some embodiments, is proportional to the severity score. In aspects, each object defined in the dangerous repository 138 is also stored with at least one representative image of the object.

In embodiments, the spoil repository 140 stores data that defines conditions to be avoided so as not to disturb an object detected in an image. For example, the audible noise and/or a flash emitted by a digital camera when a picture is taken may disturb an animal that is the subject of the picture. As another example, the user talking while taking a picture of an animal may disturb the animal that is the subject of the picture. As another example, the user getting too close to an animal while taking a picture of the animal may disturb the animal that is the subject of the picture.

In aspects, each object defined in the spoil repository 140 is stored with an object name, one or more suggested camera features to disable, and an associated safe distance. Suggested camera features to disable may include, for example, disabling the flash and disabling a shutter noise. In embodiments, a system administrator controls the data that is stored in the spoil repository 140, and this data may be input to the spoil repository 140 in any suitable manner including manual data entry, data import, etc. In aspects, each object defined in the spoil repository 140 is also stored with at least one representative image of the object.

According to aspects of the invention, the analysis module 132 searches for the object detected in the image data (e.g., detected by the object detection module 130 in the image data received from the camera device 100) in the objects defined in each of the hazardous repository 136, the dangerous repository 138, and the spoil repository 140. In the event the analysis module 132 determines a match based on the searching, then the analysis module 132 sends an alert to the camera device 100. For example, in response to the object detection module 130 determining an object in the image data is a bee and the analysis module 132 determining that a bee is listed in the hazardous repository 136, the detection server 102 generates and transmits an alert to the camera device 100. The alert can take different forms as described herein.

In one embodiment, the searching performed by the analysis module 132 is based only on a name of the object detected by the object detection module 130. In this embodiment, the analysis module 132 compares the name of the object detected by the object detection module 130 to data (e.g., text) stored in each data record of each of the hazardous repository 136, the dangerous repository 138, and the spoil repository 140.

In another embodiment, the searching performed by the analysis module 132 is based on a name of the object detected by the object detection module 130 and additional information obtained from external sources 134. In this embodiment, the analysis module 132 obtains the additional information by searching the external sources 134 using the name of the object detected by the object detection module 130. The external sources 134 may comprise publicly accessible online data such as dictionaries, encyclopedias, wikis, etc. For example, in response to the object detection module 130 determining that the object in the image data is a bee, the analysis module 132 searches the external sources 134 and determines based on the search that anaphylactic shock is an allergic reaction that some people have to bee stings. Based on this, the analysis module 132 searches the hazardous repository 136, the dangerous repository 138, and the spoil repository 140 for both bee and anaphylactic shock. If either search term returns a result from any of the repositories, then the detection server 102 generates and transmits an instruction to the camera device 100 to output an alert to the user of the camera device 100.

Figure 3A:
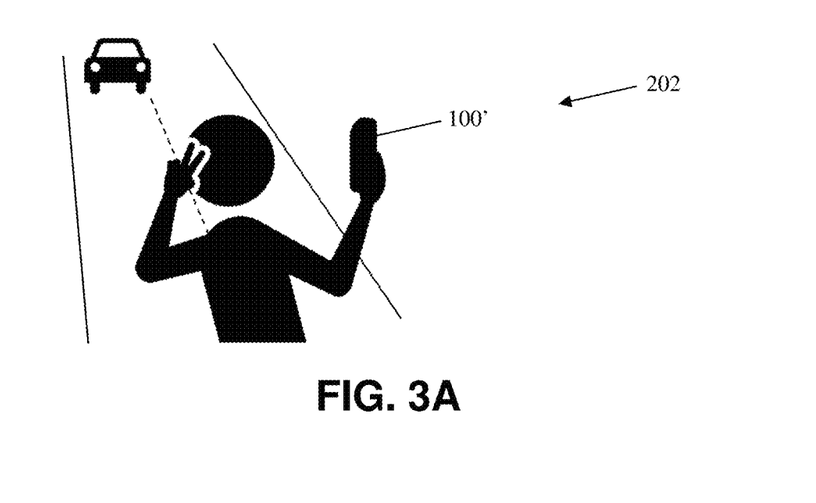
FIGS. 3A and 3B show an exemplary implementation in accordance with aspects of the invention.
Figure 3B:
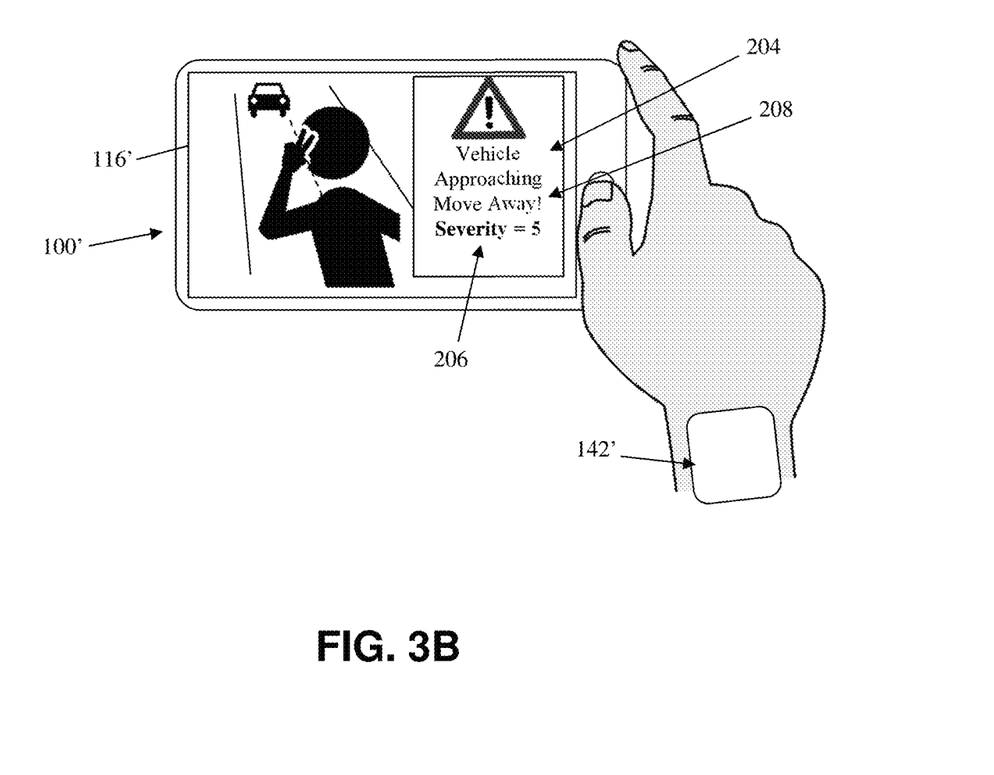

FIGS. 3A and 3B illustrate an exemplary alert in accordance with aspects of the invention. In embodiments, the instruction that the detection server 102 sends to the camera device 100 causes the camera device 100 to output an alert that includes at least one of: an indication of the object; an indication of the severity; and a distance related instruction. FIG. 3A illustrates a real world scene 202 in which the user uses the camera device 100' to take a picture of the user, e.g., a selfie. The camera device 100' captures image data from the real world scene 202 and sends the image data (and other associated data described herein) to the detection server. In this example, the detection server determines that an approaching vehicle is an object in the picture, and determines from the dangerous repository 138 that an approaching vehicle is a potentially dangerous object. As a result, the detection server transmits an instruction to the camera device 100' that causes an alert to be displayed on the display 116' of the camera device 100' as shown in FIG. 3B. In this example, the alert includes: an indication of the detected object 204 ("Vehicle Approaching"); an indication of the severity 206 ("Severity=5"); and a distance related instruction ("Move Away!") 208. In embodiments, the system also causes an alert (e.g., a haptic alert) to be generated at the wearable device 142' since the user may be so intently focused on the subject of the picture that they might not notice the visual warning on the display screen.

In another exemplary use case that illustrates a hazard that is specific to a particular user, the user points the camera device in the direction of a real world scene to take a picture of the flower that is in the real world scene. The camera device captures image data from the real world scene and sends the image data (and other associated data described herein) to the detection server. In this example, the detection server determines that a bee is an object in the picture, and determines from the hazardous repository 136 that the user is severely allergic to bee stings. As a result, the detection server transmits an instruction to the camera device that causes an alert to be displayed on the display of the camera device. In this example, the alert includes: an indication of the detected object ("Bee"); an indication of the severity ("Severity=5"); and a distance related instruction ("Back Away!"). The system may also cause an alert to be generated at the wearable device 142'.

In embodiments, the indication of the object 204 and the indication of severity 206 are based on data contained in one of the repositories. In embodiments, the distance related instruction 208 is based on a combination of distance data contained in one of the repositories and the distance to the object determined by the distance module 127. According to aspects of the invention, in response to the analysis module 132 determining a match between an object detected in the image data and an object defined in one of the repositories, the analysis module 132 compares the distance determined by the distance module 127 to the safe distance defined in the data record of the matching object in the one of the repositories. In response to the determined distance being less than the safe distance defined in the data record of the matching object, the detection server 102 generates the distance related instruction 208 with an instruction to move further away from the object. On the other hand, in response to the determined distance being equal to or greater than the safe distance defined in the data record of the matching object, the detection server 102 generates the distance related instruction 208 with an instruction to not move any closer to the object.

For example, if the detected object is a bee, and a bee is listed in the hazardous repository 136 with a minimum safe distance of 20 feet, and the determined distance from the camera object to the bee is 15 feet, then the detection server 102 generates the distance related instruction 208 with an instruction to move further away from the object. Illustrative examples include: "move away!", "move back 5 feet", "move to at least 20 feet away from the bee", and "unsafe distance". Conversely, if the detected object is a bee, and a bee is listed in the hazardous repository 136 with a minimum safe distance of 20 feet, and the determined distance from the camera object to the bee is 21 feet, then the detection server 102 generates the distance related instruction 208 with an instruction to not move any closer to the object. Illustrative examples include: "do not move any closer" and "safe distance".

In still further embodiments, the content of the alert is based on ultrasound data from the ultrasound sensor 124. According to aspects of the invention, in response to the analysis module 132 determining a match between an object detected in the image data and an object defined in one of the repositories, and further in response to the object being determined to be an animal, the analysis module 132 analyzes the ultrasound data to determine whether the animal is alive. This is because most animals that are dangerous to a user pose more of a risk to the user when the animal is alive rather than dead. For example, for a user that is allergic to bee stings a live bee most likely poses a greater risk than a dead bee. Accordingly, when the analysis module 132 determines that the animal is dead based on the ultrasound data, the detection server 102 alters the content of the alert to the user. Referring to the example of the bee that the user is allergic to, in response to the analysis module 132 determining that the bee is dead, the detection server 102 may would issue a distance related instruction 208 in the form of "Unsafe distance but appears dead" for example.

In an implementation, the instruction transmitted by the detection server 102 causes the speaker 118 of the camera device 100 to emit an audible warning tone or message. This audible alert may be in addition to, or in lieu of, the alert displayed on the display 116 of the camera device 100. In a particular embodiment, the alert causes the speaker 118 to emit a number of warning tones equal to the numeric value of the severity of the detected object (e.g., 5 warning tones for a severity score of 5).

In an implementation, the instruction transmitted by the detection server 102 causes the vibration system 126 of the camera device 100 to output a haptic warning such as a vibration or series of vibrations. This vibration alert may be in addition to, or in lieu of, the alert displayed on the display 116 of the camera device 100. In a particular embodiment, the alert causes the vibration system 126 to vibrate the camera device 100 a number of times equal to the numeric value of the severity of the detected object (e.g., 5 vibrations for a severity score of 5).

In further embodiments, the detection server 102 causes the alert to be output by the wearable computer device 142. For example, the alert may be at least one of: visually displayed on the display 156 of the wearable computer device 142; output as an audible warning tone or message from the speaker 154 of the wearable computer device 142; and output as one or more vibrations generated by the vibration system 152 of the wearable computer device 142. Outputting the alert at the wearable computer device 142 may be in addition to, or in lieu of, outputting the alert at the camera device 100.

According to further aspects of the invention, in response to the analysis module 132 determining a match between an object detected in the image data and an object defined in the spoil repository 140, the detection server 102 transmits an instruction to the camera device 100 to disable one or more features of the camera device 100. In embodiments, each object defined in the spoil repository 140 is stored with one or more suggested camera features to disable. For example, a data record for a bird in the spoil repository 140 may include data suggesting that the flash be disabled when this bird is detected in the image data. In this example, the detection server 102 sends an instruction to the camera device 100 to disable the flash 120 while the bird is detected in the image. In response to receiving the instruction, the camera device 100 disables the flash 120 and displays a message informing the user that the flash is disabled. In embodiments, the instruction sent by the detection server 102 causes the camera device 100 to display an alert, e.g., similar to the alert displayed for hazardous or dangerous objects.

In embodiments, the camera device 100 continues to determine the distance from the camera device to the object and transmit this determined distance to the detection server 102. In aspects, the detection server 102 compares the determined distance to the defined safe distance associated with the object defined in the spoil repository 140 and continues to transmit the instruction to the camera device 100 to disable the feature as long as the determined distance is less than the defined safe distance. When the detection server 102 determines that the determined distance is equal to or greater than the defined safe distance associated with the object defined in the spoil repository 140, the detection server 102 transmits an instruction to the camera device 100 that causes the camera device 100 to enable the feature that was disabled. In this manner, implementations of the invention provide a method and system for automatically disabling and re-enabling features of the camera device 100 based on a determined distance from an identified object in the field of view of the camera device 100.

Figure 4:
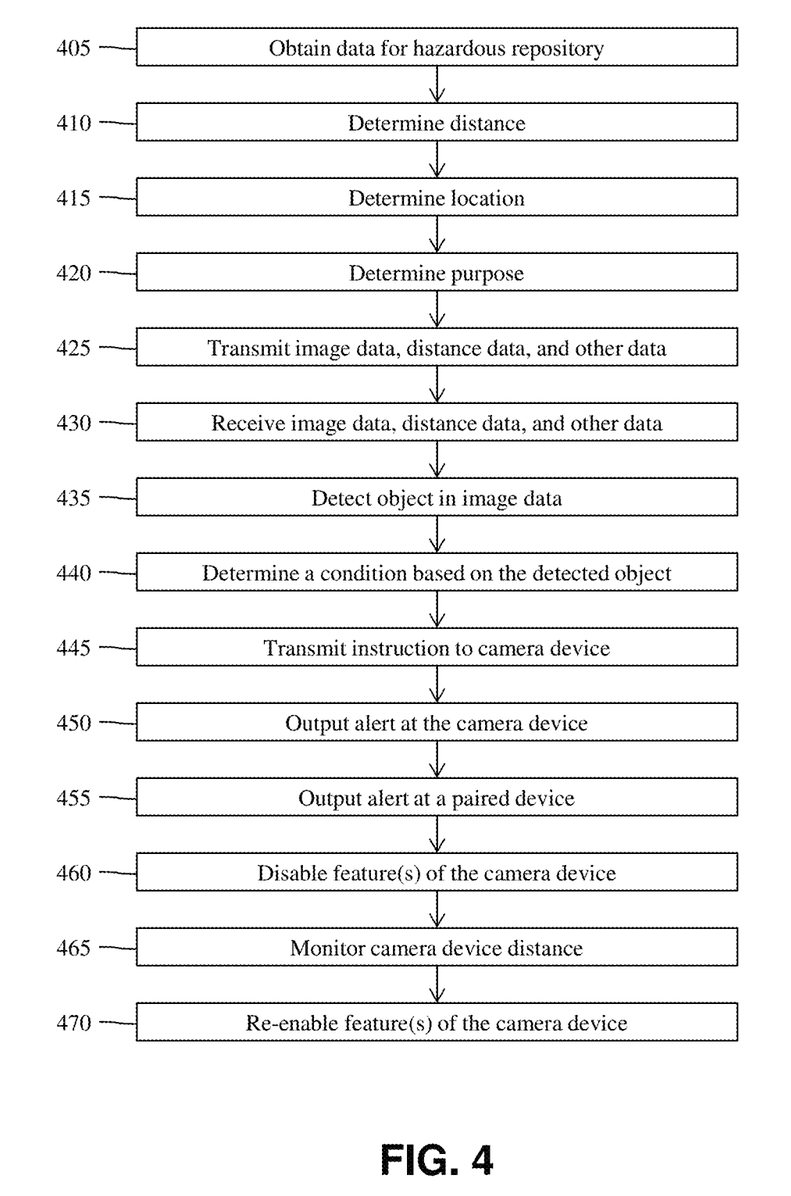
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIG. 2.

At step 405, the system obtains data to store in the hazardous repository 136. In embodiments, and as described with respect to FIG. 2, a user may enter data that about their allergies (e.g., allergic to bee stings) via a user interface of the detection server 102, and the detection server 102 may store this data in the hazardous repository 136 in association with this user. Additionally or alternatively, the detection server 102 may automatically obtain data to store in the hazardous repository 136 by analyzing user data such as emails, text messages, social media posts, and medical records.

At step 410, the camera device 100 determines a distance from the camera device 100 to an object in the field of view of the camera device 100. In embodiments, and as described with respect to FIG. 2, the distance module 127 determines the distance using conventional or later developed techniques.

At step 415, the camera device 100 determines its location. In embodiments, and as described with respect to FIG. 2, the camera device 100 determines the location from the location system 122. Additionally or alternatively, the location module 128 determines the location in the manner described with respect to FIG. 2.

At step 420, the camera device 100 determines a purpose. In embodiments, and as described with respect to FIG. 2, the purpose module 129 determines the purpose.

At step 425, the camera device 425 transmits image data and distance data to the detection server 102. In embodiments, and as described with respect to FIG. 2, each frame of image data sent to the detection server 102 is accompanied by distance data and optionally at least one of: location data; purpose data; and ultrasound data.

At step 430, the detection server 102 receives the data transmitted from the camera device at step 425. In embodiments, and as described with respect to FIG. 2, the detection server 102 receives the data in near real time.

At step 435, the detection server 102 detects an object in the image data that was received at step 430. In embodiments, and as described with respect to FIG. 2, the object detection module 130 uses computer vision based object detection to identify objects in a stream of image data in real time.

At step 440, the detection server 102 determines a condition based on the detected object. In embodiments, and as described with respect to FIG. 2, the analysis module 132 searches the hazardous repository 136, the dangerous repository 138, and the spoil repository 140 based on a name of the object that was detected at step 435. In additional embodiments, the analysis module searches the repositories based on a name of the object detected by the object detection module 130 and additional information obtained from external sources 134. In this manner, the determined condition is one of a hazardous condition, a dangerous condition, and a spoil condition;

At step 445, the detection server 102 transmits an instruction to the camera device based on the search determining that the object identified in the image data matches an object in one of the repositories. In embodiments, and as described with respect to FIGS. 2 and 3, the instruction that the detection server 102 sends to the camera device 100 causes the camera to output an alert to a user of the camera device 100, wherein the alert includes at least one of: an indication of the object; an indication of the severity; and a distance related instruction. In this manner, the alert is based on the determined condition and the distance data.

At step 450, the camera device 100 outputs the alert that was transmitted by the detection server 102. In embodiments, and as described with respect to FIGS. 2 and 3, the camera device 100 outputs at least one of: a visual indication of the object; a visual indication of the severity; a visual indication of a distance related instruction; an audible warning tone or message; and a haptic warning.

At step 455, the camera device 100 communicates with a paired device 142 to cause the paired device 142 to output the alert that was transmitted by the detection server 102. In embodiments, and as described with respect to FIGS. 2 and 3, the paired device 142 outputs at least one of: a visual indication of the object; a visual indication of the severity; a visual indication of a distance related instruction; an audible warning tone or message; and a haptic warning. In various implementations, step 455 may be performed in lieu of step 450, in addition to step 450, or not at all.

At step 460, the detection server 102 disables at least one feature of the camera device 100 based on the search (from step 440) determining that the object identified in the image data matches an object in the spoil repository 140. In embodiments, and as described with respect to FIG. 2, in response to the analysis module 132 determining that the determined distance of the camera device (from step 410) is less than a predefined distance associated with the matching object in the spoil repository 140, the detection server 102 transmits an instruction to the camera device 100 that causes the camera device 100 to disable one or more features listed with the matching object in the spoil repository 140.

At step 465, the detection server 102 monitors the distance between the camera device 100 and the object. In embodiments, and as described with respect to FIG. 2, the camera device 100 continues to determine the distance from the camera device 100 to the object and transmit this determined distance to the detection server 102. In aspects, the detection server 102 compares the determined distance to the defined safe distance associated with the matching object in the spoil repository 140.

At step 470, the detection server 102 re-enables the least one feature of the camera device 100 based on the monitoring of step 465. In embodiments, and as described with respect to FIG. 2, when the detection server 102 determines that the determined distance is equal to or greater than the defined safe distance associated with the object defined in the spoil repository 140, the detection server 102 transmits an instruction to the camera device 100 that causes the camera device 100 to enable the feature that was disabled.

As will be apparent from the aspects described herein, an implementation of the invention provides a method for identifying potential photographed objects and determining a safe or preferable distance, the method comprising: identifying objects located in a video frame in real time; identifying a user's personal information (e.g., medical history, past photographs, etc.); determining if any object in the video frame is potentially a hazard or threat to the user based on information about the objects (via stored data or internet searches) and the personal information of the user; and recommending an optimal distance to capture a photograph based on an acceptable threshold of safety for the user. The method may further comprise automatically adjusting features of the camera to enhance the safety for the user (e.g., turning off a flash). The adjusting the features of the camera enables the user to decrease a threshold distance of safety for the user. In some situations, the hazard or threat is a reaction by the object (e.g., the object moves).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computer device, image data and distance data from a camera device;
    detecting, by the computer device, an object in the image data;
    determining, by the computer device, a condition based on the detected object, wherein the condition is one of a hazardous condition, a dangerous condition, and a spoil condition; and
    transmitting, by the computer device, an instruction to the camera device based on the determined condition, wherein the instruction causes the camera device to output an alert to a user of the camera device, the alert being based on the determined condition and the distance data,
    wherein the detecting the object is based on location data received from the camera device,
    wherein the location data comprises a location of the camera device, the location determined by analyzing user data, and
    wherein the user data comprises at least one selected from the group consisting of: emails of the user, text messages of the user, social media posts of the user, calendar entries of the user, and mapping applications.

2. The method of claim 1, wherein the alert comprises at least one from the group consisting of: a visual indication of the detected object; a visual indication of a severity associated with the detected object; a visual indication of a distance related instruction; an audible warning tone or message; and a haptic warning.

3. The method of claim 2, wherein the visual indication of a distance related instruction is based on comparing the distance data to a predefined distance associated with the detected object.

4. The method of claim 1, wherein:
    the hazardous condition is defined in a hazardous repository as a condition that is hazardous to a user of the camera device based on user data associated with the user;
    the dangerous condition is defined in a dangerous repository as a condition that is dangerous to any user; and
    the spoil condition is defined in a spoil repository as a condition that spoils a photo.

5. The method of claim 4, further comprising the computer device determining the hazardous condition based on analyzing the user data associated with the user.

6. The method of claim 5, wherein the user data comprises at least one selected from the group consisting of: emails of the user, text messages of the user, social media posts of the user, and medical records of the user.

7. The method of claim 1, wherein:
    the camera device is paired with a paired device, wherein the camera device, the paired device, and the computer device each is a different respective device; and
    the instruction causes the paired device output at least one from the group consisting of: a visual indication of the detected object; a visual indication of a severity associated with the detected object; a visual indication of a distance related instruction; an audible warning tone or message; and a haptic warning.

8. The method of claim 1, further comprising disabling a feature of the camera device based on the determined condition.

9. The method of claim 8, wherein the disabling the feature comprises one of: disabling a flash of the camera device, and disabling an audible shutter tone of the camera device.

10. The method of claim 8, further comprising:
    monitoring a distance of the camera away from the detected object; and
    re-enabling the feature based on the camera being equal to or greater than a predefined distance away from the detected object.

11. The method of claim 1, wherein the detecting the object is based on purpose data received from the camera device.

12. The method of claim 1, wherein content of the alert is based on ultrasound data received from the camera device.

13. The method of claim 1, further comprising:
    disabling a feature of the camera device based on the determined condition;
    monitoring a distance of the camera away from the detected object; and
    re-enabling the feature based on the camera being equal to or greater than a predefined distance away from the detected object.

14. The method of claim 1, wherein:
    the condition is the spoil condition; and
    the spoil condition is defined in a spoil repository as a condition that spoils a photo.

15. A computer program product, the computer program product comprising a computer readable storage medium having program instructions embodied therewith, the program instructions executable by a computing device to cause the computing device to:
    receive image data, distance data, and location data from a camera device;
    detect an object in the image data based on the location data;
    determine a condition based on the detected object, wherein the condition is one of a hazardous condition, a dangerous condition, and a spoil condition;

transmit an instruction to the camera device based on the determined condition, wherein the instruction causes the camera device to output an alert to a user of the camera device, the alert is based on the determined condition and the distance data, and the alert includes a distance related instruction;

disable a feature of the camera device based on the determined condition;

monitor a distance of the camera away from the detected object; and re-enable the feature based on the camera being equal to or greater than a predefined distance away from the detected object.

16. The computer program product of claim 15, wherein the alert additionally comprises at least one from the group consisting of: a visual indication of the detected object; a visual indication of a severity associated with the detected object; an audible warning tone or message; and a haptic warning.

17. The computer program product of claim 15, wherein the visual indication of the distance related instruction is based on comparing the distance data to a predefined distance associated with the detected object.

18. The computer program product of claim 15, wherein:
the condition is the spoil condition; and
the spoil condition is defined in a spoil repository as a condition that spoils a photo.

19. The computer program product of claim 18, wherein the spoil repository defines for each respective one of plural objects:

an object name; and
one or more suggested camera features to disable.

20. A computer program product, the computer program product comprising a computer readable storage medium having program instructions embodied therewith, the program instructions executable by a computing device to cause the computing device to:

receive image data, distance data, and location data from a camera device;

detect an object in the image data based on the location data;

determine a condition based on the detected object, wherein the condition is one of a hazardous condition, a dangerous condition, and a spoil condition; and transmit an instruction to the camera device based on the determined condition, wherein the instruction causes the camera device to output an alert to a user of the camera device, the alert is based on the determined condition and the distance data, and the alert includes a distance related instruction, wherein the location data comprises a location of the camera device, the location determined by analyzing user data, and wherein the user data comprises at least one selected from the group consisting of: emails of the user, text messages of the user, social media posts of the user, calendar entries of the user, and mapping applications.

* * * * *